United States Patent [19]

Dangschat

[11] 4,250,763
[45] Feb. 17, 1981

[54] ROTARY TABLE DRIVE MECHANISM

[75] Inventor: Holmer Dangschat, Traunwalchen, Fed. Rep. of Germany

[73] Assignee: Dr. Johannes Heidenhain GmbH, Traunreut, Fed. Rep. of Germany

[21] Appl. No.: 22,781

[22] Filed: Mar. 22, 1979

[30] Foreign Application Priority Data

Apr. 5, 1978 [DE] Fed. Rep. of Germany ....... 2814612

[51] Int. Cl.³ ...................... F16H 13/02; F16H 13/00; F16H 13/12
[52] U.S. Cl. ........................................ 74/208; 74/202; 74/206; 74/209; 74/210
[58] Field of Search .................. 74/206, 199, 202, 207, 74/208, 209

[56] References Cited

U.S. PATENT DOCUMENTS

| 2,092,714 | 9/1937 | Flygare | 74/206 X |
| 2,566,674 | 9/1951 | Odenthal | 74/206 |
| 2,598,138 | 5/1952 | Sharp | 74/199 |
| 2,774,247 | 12/1956 | Knost | 74/206 |
| 2,902,871 | 9/1959 | Mooar | 74/206 X |
| 2,912,868 | 11/1959 | Preskitt | 74/206 X |
| 4,048,788 | 9/1977 | Kamlukin et al. | 74/209 |
| 4,093,056 | 6/1978 | Burgers | 74/206 |

FOREIGN PATENT DOCUMENTS

| 79696 | 12/1919 | Australia | 74/209 |
| 896746 | 11/1953 | Fed. Rep. of Germany | 74/209 |
| 1194176 | 11/1959 | France | 74/206 |
| 1352140 | 9/1962 | France | 74/209 |
| 240002 | 11/1945 | Switzerland | 74/199 |
| 538110 | 7/1973 | Switzerland . | |
| 246267 | 1/1926 | United Kingdom | 74/209 |
| 708235 | 4/1954 | United Kingdom | 74/199 |

Primary Examiner—Leslie Braun
Attorney, Agent, or Firm—Hume, Clement, Brinks, Willian & Olds

[57] ABSTRACT

A driving apparatus for rotating a rotary table is described including a drive mechanism and a guide apparatus. The drive mechanism includes a drive roller which contacts a peripheral surface of the rotary table to rotate the table, a support element and a press-on element which hold the drive roller against the table and apply compensating forces which prevent the drive mechanism from applying distorting forces to the support bearings of the table. The drive mechanism is guided at the periphery of the table by a pair of guides which permit substantially friction free translation of the drive mechanism in a plane perpendicular to the axis of rotation of the table while preventing rotation of the drive mechanism or translation out of the plane.

28 Claims, 2 Drawing Figures

ROTARY TABLE DRIVE MECHANISM

BACKGROUND OF THE INVENTION

The present invention relates to a drive mechanism for a rotary element, such as a rotary table, in which the drive mechanism engages the table circumference. Such rotary elements are used in various machines and in devices for angular adjustment or angular measurement.

It is a known practice to drive a rotary table from beneath the table by means of a compensating coupling secured to the axis of rotation of the table. This approach may isolate the table from transverse drive forces, but it is not always applicable, for it requires that the rotary table be accessible from below.

Another known practice is to drive a round table laterally. This approach, however, may apply transverse forces to the table, for any uncompensated drive forces must be absorbed by the table bearing. Such drive forces may produce deformations in the rotary bearings which may result in reduced precision of operation.

Swiss patent No. 538,110 discloses a lateral rotary table drive in which a drive rim provided on the table is clamped between a drive element and an opposed supporting element and both the drive element and the supporting element are aligned along a radius of the table. The drive element and the supporting element are both freely shiftable along the radial direction and are resiliently biased toward each other against the table rim. In this way no net radial force is exerted on the table bearing by the drive mechanism along the radius extending between the drive element and the table center; however, unbalanced forces are applied to the table rim in the direction perpendicular to the radius and these unbalanced forces must be absorbed by the table bearing.

SUMMARY OF THE INVENTION

The present invention is directed to a mechanism for rotating a rotary element substantially without applying transverse forces to the element. According to this invention the drive mechanism is mounted to move freely with only translatory degrees of freedom in a plane perpendicular to the axis of rotation of the rotary element.

An important advantage of this invention is that this drive laterally engages the rotary element substantially without applying transverse forces thereto. In this way relatively simple means are provided for accomplishing high precision rotary positioning.

This invention, together with further objects and attendant advantages, will be best understood by reference to the following description taken in conjunction with the accompanying drawings.

DETAILED DESCRIPTION OF PREFERRED EMBODIMENTS

Figure 1:
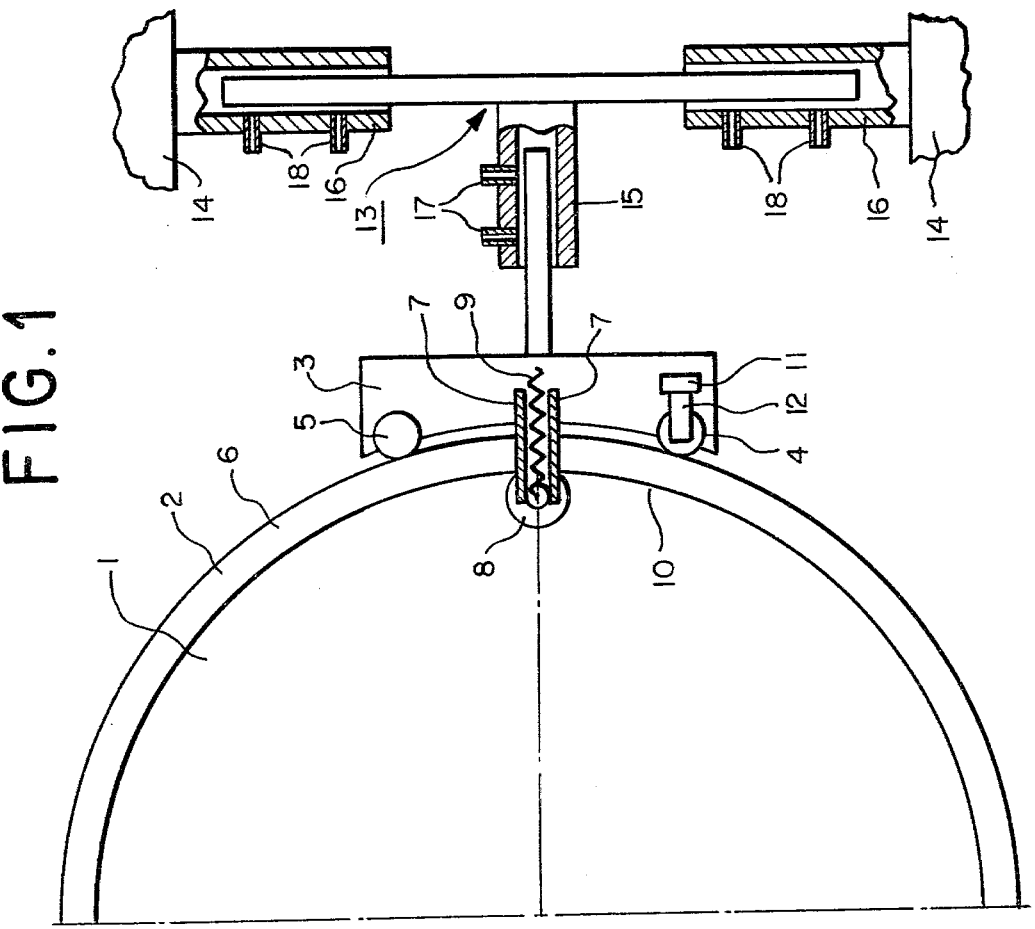
FIG. 1 shows a first preferred embodiment of the invention including linear guides for the drive mechanism.

Referring now to the drawings, FIG. 1 shows in plan view a portion of a rotary table 1 having a wheel rim 2 and a drive mechanism 3 engaging the rim 2 laterally in the plane of the rotary table 1. This drive mechansim 3 presents at one end a drive element 4 in the form of a friction wheel and at the other end a supporting element 5 in the form of a roller. The drive element 4 and supporting element 5 are biased against the outer surface 6 of the wheel rim 2 by means by a biasing element arranged to move along a guide 7 on the drive mechanism 3. The biasing element includes a roller 8 which engages an inner surface 10 of the wheel rim 2 by means of a pull spring 9 fastened to the drive mechanism 3. The drive element 4 is rotated by an electric motor 11 by means of a gear 12, both of which are mounted on the drive mechanism 3.

The drive mechanism 3 is mounted to a support body 14 by means of a guide structure 13. This guide structure 13 includes two mutually perpendicular linear guides 15,16 which permit movement of the drive mechanism 3 virtually without friction in the plane of the rotary table 1 along the radial and tangential directions, respectively. Thus, the drive mechanism 3 has two translatory degrees of freedom in the plane of the rotary table 1, while it is restrained against any rotation in this plane.

The linear guides 15,16 preferably include air bearings 17,18, as shown, or can be alternately provided with other types of bearings, such as roller bearings or slide bearings.

Figure 2:
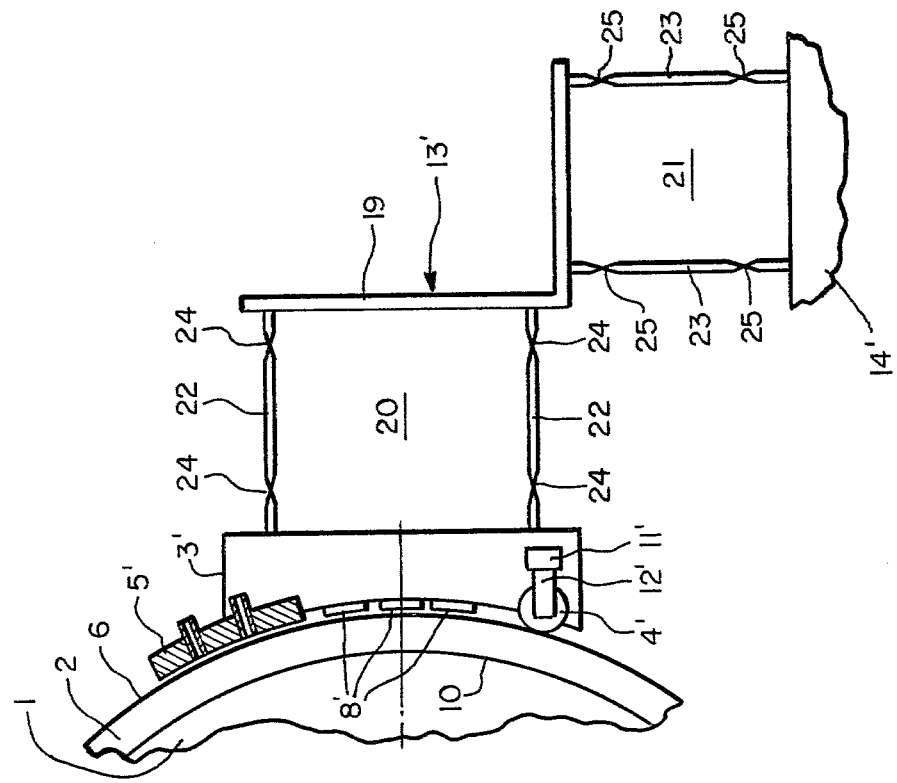
FIG. 2 shows a second preferred embodiment of the invention including parallelogram guides for the drive mechanism.

FIG. 2 depicts a second preferred embodiment of the invention including a drive mechanism 3' having at one end a drive element 4' in the form of a friction wheel and at the other end a supporting element 5' in the form of an air bearing. The drive element 4' and the supporting element 5' are biased against the outer surface 6 of the wheel rim 2 of the rotary table 1 by means of three magnetic biasing elements 8' provided on the drive mechanism 3.

The drive mechanism 3' is connected by means of a guide structure 13' to a fixed support body 14'. This guide structure 13' includes a gudie angle piece 19 and two guide parallelograms 20,21. The parallelograms 20,21 include bars 22,23 which are provided with thin places 24,25, respectively, which serve as hinges. The guide structure 13', therefore, allows the drive mechanism 3' to move in the radial and tangential directions in the plane of the table 1 substantially free of friction so that the drive mechanism 3 has only translatory degrees of freedom in the plane of the rotary table 1, while it is restrained against any rotation in this plane.

In the drive apparatus according to this invention, the drive mechanism is mounted to engage the periphery of a rotary table so as to be free to move substantially without friction in the plane of the rotary table along both the radial and the tangential directions. In this way, substantially no transverse forces are applied to the bearing of the rotary table and, accordingly, errors due to deformations of the suspension of the rotary table are substantially prevented.

Of course, it should be understood that various changes and modifications to the preferred embodiments described herein will be apparent to those skilled in the art. For example, the drive mechanism may include a gear wheel or a worm ger instead of the pressure roller depicted. Furthermore, a slide bearing or a gear wheel may be used as a supporting element and a vacuum element may be used as a biasing element in the drive mechanism. Such changes and modifications can be made without departing from the spirit and scope of the present invention, and without diminishing its attendant advantages. It is, therefore, intended that such changes and modifications be covered by the following claims.

I claim:

1. In combination with a rotatable element and an apparatus for angular measurement or angular adjustment of the rotatable element, the improvement comprising:
   a first guide oriented tangentially to the rotatable element, the first guide attached to a rigid support body and having one degree of translatory freedom with respect thereto in the plane of rotation of the rotatable element;
   a second guide oriented radially to the rotatable element, perpendicular to the first guide, the second guide attached to the first guide and lying in the plane of rotation of the rotatable element, the second guide having one degree of translatory freedom with respect to the first guide in the plane of rotation of the rotatable element, the degree of translatory freedom of the first guide being perpendicular to the degree of translatory freedom of the second guide;
   a biasing element attached to the second guide to engage a peripheral surface of the rotatable element;
   a drive element attached to the second guide to engage a peripheral surface of the rotatable element, and positioned to one side of the biasing element; and
   a supporting element attached to the second guide to engage a peripheral surface of the rotatable element, and positioned to the other side of the biasing element from the drive element and equidistant with the drive element from the biasing element, said biasing, drive, and supporting elements lying in the plane of rotation of the rotatable element and arranged such that the vector sum of the forces applied to the rotatable element by the biasing, drive, and supporting elements is a substantially purely rotational drive force, said first and second guides cooperating with the biasing, drive, and supporting elements such that substantially no transverse forces are applied by the drive apparatus to the axis of rotation of the rotatable element.

2. In combination with a rotary element and a drive apparatus for the rotary element, the improvement comprising:
   a drive mechanism for applying a substantially purely rotational drive force to a peripheral surface of the rotary element; and
   means for guiding the drive mechanism adjacent the peripheral surface to provide the drive mechanism with only two translatory degrees of freedom in a plane perpendicular to the axis of rotation of the element to allow the drive mechanism to position itself such that substantially no transverse forces are applied by the drive mechanism to the axis of rotation of the element.

3. The drive apparatus of claim 1 wherein the guiding means is mounted to a fixed support element.

4. The drive apparatus of claim 1 or 2 wherein the guiding means includes a first linear guide mounted tangentially to a radius of the rotary element and a second linear guide coupled to the first linear guide and oriented along a radius of the rotary element.

5. The drive apparatus of claim 1 or 2 wherein the guiding means includes a first guide parallelogram and a second guide parallelogram coupled to the first guide parallelogram, said first and second guide parallelograms oriented to permit the drive mechanism to move radially and tangentially with respect to the rotary element.

6. The drive apparatus of claim 4 wherein the first and second guide parallelograms include bars having thin segments which act as hinges.

7. The drive apparatus of claim 1 or 2 wherein the drive mechanism includes a drive element, a supporting element, and a biasing element.

8. The drive apparatus of claim 6 wherein the drive element includes a friction wheel.

9. The drive apparatus of claim 6 wherein the support element includes a roller.

10. The drive apparatus of claim 6 wherein the support element includes an air bearing.

11. The drive apparatus of claim 6 wherein the biasing element includes a roller and means for biasing the roller against the rotary element.

12. The drive apparatus of claim 6 wherein the biasing element includes a magnet.

13. The drive apparatus of claim 6 wherein the drive element and the supporting element are placed on opposite sides of, and equidistant from, the biasing element along the peripheral surface of the rotary element in the plane of rotation of the rotary element.

14. In combination with a rotary element and an apparatus for angular measurement or angular adjustment of the rotatable element, the improvement comprising:
   a drive mechanism for driving the rotatable element, said drive mechanism operable to engage a peripheral surface of the rotatable element and to apply a substantially purely rotational drive force to the rotatable element; and
   means for guiding the drive mechanism along the peripheral surface of the rotatable element such that the drive mechanism has only two translatory degrees of freedom in a plane perpendicular to the axis of rotation of the rotatable element, and no other degrees of freedom, said guiding means acting to allow the drive mechanism to position itself such that substantially no transvserse forces are applied by the drive mechanism to the axis of rotation of the rotatable element.

15. The apparatus of claim 13 wherein the guiding means is mounted to a fixed, rigid support means.

16. The apparatus of claim 13 or 14 wherein the guiding means comprises a first linear guide having an orientation tangential to the rotatable element and a second linear guide coupled to the first linear guide, said second linear guide oriented perpendicular to the first linear gude along a radius of the rotatable element.

17. The apparatus of claim 16 wherein each linear guide comprises:
   a linear shaft; and
   a substantially friction-free bearing element surrounding at least one end portion of the linear shaft.

18. The apparatus of claim 16 wherein the bearing elements are air bearings.

19. The apparatus of claim 16 wherein the bearing elements of the first linear guide are mounted to the support means.

20. The apparatus of claim 16 wherein the bearing elements of the second linear guide are rigidly mounted to the linear shaft of the first linear guide.

21. In combination with a rotatable element and an apparatus for angular measurement or angular adjustment of the rotatable element, the improvement comprising:
   a drive mechanism for driving the rotatable element, said drive mechanism engaging a peripheral surface of the rotatable element, and applying a substantially purely rotational drive force to the rotatable element,
   means for guiding the drive mechanism in a plane perpendicular to the axis of rotation of the rotatable element such that the drive mechanism is provided with only two translatory degress of freedom in said plane, and no other degrees of freedom, said drive mechanism cooperating with said guiding means such that substantially no transverse forces are applied by the drive mechanism to the axis of rotation of the rotatable element.

22. The apparatus of claim 20 wherein the drive mechanism includes a drive element, a supporting element, and a biasing element.

23. The apparatus of claim 21 wherein the drive element includes a friction wheel engaging a first side of the pheripheral surface.

24. The apparatus of claim 21 wherein the supporting element includes a support wheel engaging a first side of the peripheral surface.

25. The apparatus of claim 21 wherein the biasing element includes a biasing wheel engaging a second side of the peripheral surface, and means for urging the biasing wheel against the second side of the peripheral surface.

26. The apparatus of claim 24 wherein the urging means includes a tension spring.

27. The apparatus of claim 21 wherein the drive element and the supporting element are placed on opposite sides of, and equidistant from, the biasing element along the peripheral surface of the rotary element in the plane of rotation of the rotary element.

28. The apparatus of claim 21 wherein the drive element, the supporting element, and the biasing element are so arranged that the vector sum of forces exerted by them at the axis of rotation of the rotatable element is zero.

* * * * *

UNITED STATES PATENT AND TRADEMARK OFFICE
CERTIFICATE OF CORRECTION

PATENT NO. : 4,250,763

DATED : February 17, 1981

INVENTOR(S) : Holmer Dangschat

It is certified that error appears in the above—identified patent and that said Letters Patent is hereby corrected as shown below:

Column 1, line 24, please delete "drive", second occurrence, and substitute therefor --driven--;

Column 2, line 41, please delete "gudie" and substitute therefor --guide--;

Column 2, line 64, please delete "ger" and substitute therefor --gear--;

Column 3, line 62, please delete "1" and substitute therefor --2--;

Column 3, line 64, please delete "1" and substitute therefor --2--;

Column 3, line 64, please delete "2" and substitute therefor --3--;

Column 4, line 1, please delete "1" and substitute therefor --2--;

Column 4, line 1, please delete "2" and substitute therefor --3--;

Column 4, line 8, please delete "4" and substitute therefor --5--;

Column 4, line 11, please delete "1" and substitute therefor --2--;

Column 4, line 11, please delete "2" and substitute therefor --3--;

Column 4, line 14, please delete "6" and substitute therefor --7--;

Column 4, line 16, please delete "6" and substitute therefor --7--;

Column 4, line 18, please delete "6" and substitute therefor --7--;

Column 4, line 20, please delete "6" and substitute therefor --7--;

UNITED STATES PATENT AND TRADEMARK OFFICE
CERTIFICATE OF CORRECTION

PATENT NO. : 4,250,763

DATED : February 17, 1981

INVENTOR(S) : Holmer Dangschat

It is certified that error appears in the above—identified patent and that said Letters Patent is hereby corrected as shown below:

Column 4, line 23, please delete "6" and substitute therefor --7--;
Column 4, line 25, please delete "6" and substitute therefor --7--;
Column 4, line 50, please delete "13" and substitute therefor --14--;
Column 4, line 52, please delete "13" and substitute therefor --14--;
Column 4, line 52, please delete "14" and substitute therefor --15--;
Column 4, line 58, please delete "gude" and substitute therefor --guide--;
Column 4, line 64, please delete "16" and substitute therefor --17--;
Column 4, line 62, please delete "16" and substitute therefor --17--;
Column 5, line 1, please delete "16" and substitute therefor --17--;
Column 5, line 16, please delete "degress" and substitute therefor --degrees--;
Column 5, line 22, please delete "20" and substitute therefor --21--;
Column 6, line 1, please delete "21" and substitute therefor --22--;
Column 6, line 3, please delete "pheripheral" and substitute therefor --peripheral--;
Column 6, line 4, please delete "21" and substitute therefor --22--;
Column 6, line 7, please delete "21" and substitute therefor --22--;

UNITED STATES PATENT AND TRADEMARK OFFICE
CERTIFICATE OF CORRECTION

PATENT NO. : 4,250,763
DATED : February 17, 1981
INVENTOR(S) : Holmer Dangschat

It is certified that error appears in the above—identified patent and that said Letters Patent is hereby corrected as shown below:

Column 6, line 12, please delete "24" and substitute therefor --25--;
Column 6, line 14, please delete "21" and substitute therefor --22--;
Column 6, line 19, please delete "21" and substitute therefor --22--.

Signed and Sealed this

Eleventh Day of August 1981

[SEAL]

Attest:

Attesting Officer

GERALD J. MOSSINGHOFF
Commissioner of Patents and Trademarks